July 28, 1970  F. J. CARSON ET AL  3,522,029
METHOD OF RESHAPING GLASS SHEETS BY DIFFERENTIAL COOLING
Filed Dec. 22, 1966  4 Sheets-Sheet 1
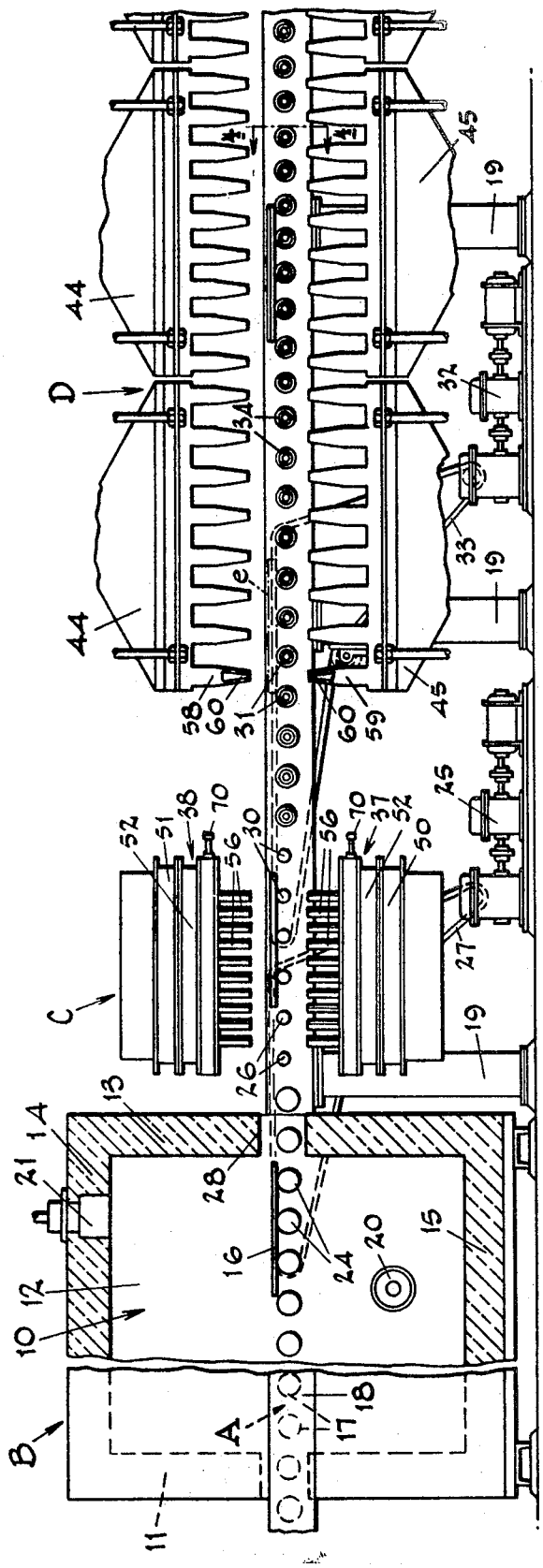
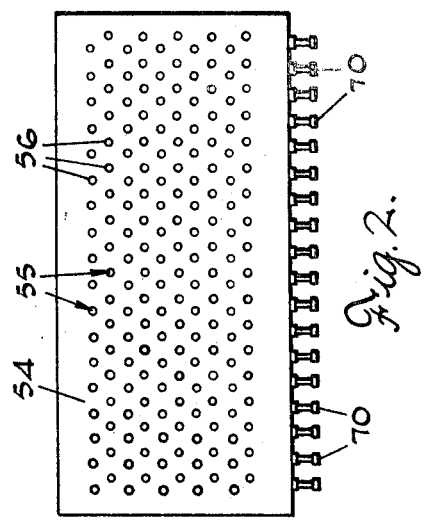
INVENTORS
Frank J. Carson and
BY George F. Ritter, Jr.
Nobbe & Collins
ATTORNEYS INVENTORS
Frank J. Carson and
George F. Ritter, Jr.
BY
Hobbe & Collins
ATTORNEYS INVENTORS
Frank J. Carson and
BY George F. Ritter, Jr.

Hobbe & Collins
ATTORNEYS

INVENTORS
Frank J. Carson and
George F. Ritter, Jr.
BY Nobbe & Collins
ATTORNEYS United States Patent Office 3,522,029
Patented July 28, 1970

3,522,029
METHOD OF RESHAPING GLASS SHEETS BY DIFFERENTIAL COOLING
Frank J. Carson and George F. Ritter, Jr., Toledo, Ohio, assignors to Libbey-Owens-Ford Company, Toledo, Ohio, a corporation of Ohio
Filed Dec. 22, 1966, Ser. No. 604,006
Int. Cl. C03b 23/02
U.S. Cl. 65—104     6 Claims

ABSTRACT OF THE DISCLOSURE

Bending and tempering glass sheets, particularly thin glass sheets, in a continuous procedure as the sheets are moved along a path by directing closely spaced individual streams of cooling fluid against the opposite surfaces of the sheet from sources of cooling fluid under comparatively high pressure and regulating the amount of fluid directed against the opposite surfaces of the sheet or against different areas of the sheet to establish a differential rate of cooling of the areas and/or surfaces to cause the sheet to warp to a desired preselected curvature as it is being tempered, and moving the sheet along the path at variable speeds commensurate with the treatment to which the sheet is being subjected.

---

The present invention relates broadly to the bending of glass sheets or plates and more particularly to an improved method of and apparatus for producing bent, tempered glass sheets.

In well known commercial procedures for bending and tempering sheets or plates of glass, sheets are first heated to a temperature corresponding substantially to the softening point of the glass, bent on a contoured shaping surface conforming in curvature to the desired curvature of the bent sheet and then tempered by chilling the sheet to a temperature below the annealing range of the glass.

The actual bending of the sheet may be accomplished by permitting the heat softened sheet to sag under the influence of gravity against a concavely curved shaped surface formed on an outline or skeleton type bending mold or by pressing the heat softened sheet between two opposed complemental shaping surfaces.

In these procedures, the bent sheet is usually tempered by flushing the opposite surfaces of the heated sheet with a suitable cooling fluid such as air or the like to chill the glass and impart the desired stresses therein.

Glass sheets treated in this general manner have been widely used in recent years as side lights and back lights in automobiles and other vehicles. Vehicle glazing closures of this type are usually formed from sheets of glass of the well-known soda-lime-silica glass composition approximately ¼" thick, which may be readily shaped while heat softened and then tempered. Recently, however, there has been more and more demand for window closures for vehicles made from thinner sheets of glass to reduce the weight of the windows. For example, back lights formed of ⅛" thick sheetts are now very popular for use on automobiles with convertible tops since these lights offer all of the advantages of glass over the plastic closures formerly used while being sufficiently light weight to permit them to be carried by the fabric top without additional support.

As is well known in the art, as the thickness of the sheet to be tempered decreases, to produce a given temper in the glass, the rate of cooling of the sheet from the elevated temperature to a temperature below the annealing range of the glass must be increased. To properly temper the thinner sheets of glass, the present invention contemplates directing large volumes of cooling air in a plurality of individual streams against the sheet so that each stream impinges on the sheet and the air in the stream flows outwardly across the surface of the sheet to absorb heat from the glass and carry this heat rapidly away from the sheet.

Further in accordance with the invention, it is proposed to control the rate of cooling of the opposite surfaces of the sheet in such a manner as to warp the glass to a definite preselected curvature by regulating the pressure of the air in the streams being directed against the opposite surfaces. In this way the sheets are bent without contacting their heat softened surfaces with a bending fixture of any description.

Another object of the invention is to permit regulating of the warping of the sheet to produce sheets bent to different preselected curvatures by varying the volume of air in the individual streams being directed against the sheet across the sheet so that the various areas of one or both surfaces of the sheet may be cooled at different rates thereby causing these different areas to warp to different degrees.

Also according to the invention, the sheets are produced in a continuous procedure which lends itself to the efficient production of bent and tempered sheets in large quantities such as would be necessary to satisfy the needs of the automobile industry. To this end, sheets are moved continuously through contiguous heating, chilling and cooling areas at variable speeds so that they pass through each area at a speed commensurate with the treatment the sheet is to receive in that area.

Other objects and advantages of the invention will become more apparent during the course of the following description when taken in connection with the accompanying drawings.

In the drawings, wherein like numerals are employed to designate like parts throughout the same:

FIG. 1 is a longitudinal vertical section through heating and cooling apparatus by which the method of this invention is to be practiced;

FIG. 2 is a plan view of a portion of the apparatus of FIG. 1;

FIG. 3 is a perspective view of a glass sheet bent in accordance with the present invention;

Figure 4:
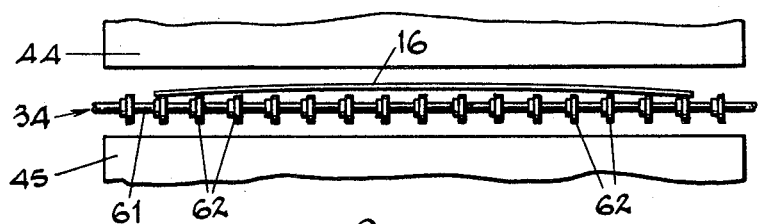
FIG. 4 is a transverse vertical section taken on line 4—4 of FIG. 1.

Referring now to the drawings and particularly to FIG. 1, there is shown an apparatus for bending and tempering a glass sheet, or succession of glass sheets, in accordance with the invention. This apparatus includes, generally, a roller conveyor system A, a heating furnace B, a bending and tempering or chilling section C arranged in close proximity to the exit end of the furnace for receiving the heated glass sheets therefrom and a cooling section D adjoining the section C.

The furnace B comprises a substantially closed heating chamber 10 defined by a front wall 11, side walls 12, rear wall 13, top wall 14 and floor or bottom 15. Flat glass sheets 16 to be bent are carried through the heating chamber along a substantially horizontally disposed path by the roller conveyor system A which includes a series of rolls 17 in the entry and medial area of the heating chamber 11. The rolls of the conveyor system A, in its entirety, are mounted at their ends on channels 18 supported along the sides of the apparatus by pedestals 19.

The heating chamber 10 is maintained at regulated temperatures by burners 20 located in the side walls 12, beneath the conveyor rolls 17 and by similar burners 21 in the top wall 14. The burners 20 and 21 are preferably arranged and controlled to provide heat patterns or zones of progressively increasing temperatures from the entry end to the exit end of the furnace.

It has also been observed that the heat softened surfaces of the glass sheets are very susceptible to being marred or otherwise distorted by contact with the conveyor rolls. While not necessary to the practice of the present invention, damage to the surface of the sheets may be minimized or eliminated by regulating the operation of the burners 20 and 21 to maintain proportionately lower temperatures below the conveyor than above the conveyor. This will result in an unequal heat distribution in the sheet with the upper surface being heated to a higher temperature than the bottom surface. This temperature differential will cause the sheet to wrap or arch upwardly from the conveyor so as to ride on its peripheral edges on the conveyor rolls with the major portions thereof out of contact with the rolls.

As the glass sheets 16 are carried through the heating chamber 10, they are progressively heated from room temperature to substantially the softening point of the glass, at which all strain will be relieved. As herein contemplated, if the differential heating practice is followed, the upper surfaces of the sheets will be heated to a temperature ranging between 1160° F. and 1200° F. (preferably about 1180° F.) and the bottom surfaces heated to a relatively lower temperature ranging between 1120° F. and 1165° F. (preferably about 1140° F.).

As will be disclosed in detail in the description to follow, in accordance with the invention, the rate of movement of the sheets during each phase of the operation is controlled so as to be commensurate with the operation being performed on the sheet during that phase. Thus the sped of movement of the sheets is varied throughout the process to move them through the heating section at one speed, from the heating section to the chilling section at a faster speed so that the sheets will lose a minimum of heat during this transfer, through the chilling section at a slower speed to enable utilizing relatively small equipment to perform this function, between the chilling section and the cooling section at a faster speed and then through the cooling section at a slow speed.

In this connection as the glass sheets approach the exit end of the furnace, they are received on rolls 24 of the conveyor system A which are driven in common from a variable speed power source 25 which rolls 26 in the entry area of the primary cooling section C through a chain drive 27. Upon reaching the exit end of the furnace, the heated glass sheets 17 thus pass through a slotted opening 28 in the rear wall 13 and are received on the series of conveyor rolls 26 in the entry area of the section C and are then transferred onto conveyor rolls 30 in the exit area thereof. Rolls 30 are driven in common with rolls 31 in the entry area of the cooling section D by a power source 32 of variable speed transmission through the chain drive 33. Generally speaking, the glass sheets, in succession, are thus moved through the apparatus at preselected rates of relatively slow or faster speeds commensurate with the desired periods of time in which they are moved from one section to another as from the furnace B into the section C and from the section C into the cooling section D.

Thus, while the conveyor rolls 17 in the entry and medial areas of the furnace B are driven by a power source (not shown) at a linear speed of about 200 inches per minute, the rolls 24 adjacent the exit end of the furnace and the series of rolls 26 in the entry area of the primary cooling section C are adapted to be alternatively driven at either 200 inches per minute or at a relatively higher linear speed of about 1000 inches per minute. Also the conveyor rolls 30 which remove the sheets 16 from the section C and the series of rolls 31 in the entry area of the section D are alternatively driven at a rate of speed comparable to the desired high rate of speed, i.e., 1000 inches per minute, and at a reduced rate of speed equal to that, as of 200 inches per minute, at which the conveyor rolls 34 are driven; said series of rolls 34 extending through the remainder of the secondary cooling section D.

Figure 8:
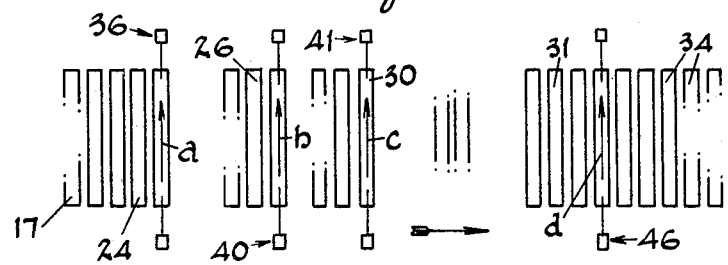
FIG. 8 is a diagramattic view of a conveyor system employed in the heating and cooling apparatus.

For these purposes, the speed differential of the series of conveyor rolls 24 and 26 is automatically controlled by a signal device 36, such as a photoelectric cell and lamp unit. When a glass sheet passes from the rolls 17 onto the rolls 24 adjacent the exit area of the heating chamber 10, its leading edge interrupts the light beam $a$ of the signal device 36, as illustrated in FIG. 8, whereupon the sheet will be carried into the area of the section C at a relatively high rate of speed, such as 1000 inches per minute, which is very desirable to ensure a minimum of heat loss to the atmosphere. As the sheet becomes bodily positioned between opposed blast heads 37 and 38 in the chilling section C, about which more will be said later, the leading edge intercepts the light beam $b$ of a signal device 40. This device affects the controls of the power source 25 to cause the conveying speed of the rolls 24 and 26 as well as the sheet to be reduced to about 200 inches per minute while the sheet is moved through the section C and is received on the series of conveyor rolls 30. At the exit area of the section C, the edge of the sheet intercepts the light beam $c$ of a signal device 41 to effect the power output of the power source 32 to increase the rate of speed of the rolls 30 and 31, for example, to a rate of 1000 inches per minute. This serves to rapidly move the sheet into the cooling section D to progressively reduce the temperature of the bent sheet. Finally, as the sheet is bodily received between the first blast-heads 44 and 45 of the section D, as indicated by the letter $e$, the leading edge interrupts the light beam $d$ of the signal device 46 to cause the power source 32 to reduce the rate of speed at which the rolls 31 are driven by the said source to about 200 inches per minute at which the rolls 34 are operated. The general spaced relation of the signal devices 36 and 40, 41 and 46 is diagrammatically illustrated in FIG. 8.

In carrying out the invention, the flat glass sheets, to be bent and tempered, are introduced into the entrance end of the heating chamber 10 onto the conveyor rolls 17 and, during their passage through the furnace B, are gradually heated to the softening point of the glass. Adjacent to the exit end of the chamber 10, each sheet is received on the conveyor rolls 24 and in due course the leading edge intercepts beam $a$ of the signal device 36 to increase the speed of movement of the sheet from about 200 to about 1000 inches per minute. Therefore, the sheet is rapidly carried between the blastheads 37 and 38 with a minimum of heat loss and thereafter the speed of its movement is reduced as the sheet's leading edge interrupts light beam $b$ of signal or sensing device 40.

Figure 6:
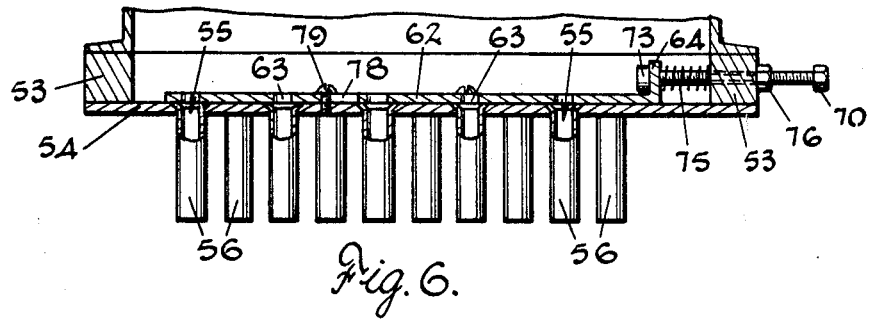
FIG. 6 is a detail view taken on line 6—6 of FIG. 5.

As shown in FIG. 1 and in plan in FIG. 2 as well as FIG. 6, the lower and upper blastheads 37 and 38 are of the tube-type and are supported by structural members 50 and 51, respectively, each of which includes a plenum 52 having a casing or continuous side closure wall 53 and a facing wall 54 disposed parallel to the conveyor. This wall 54 of the lower blasthead 37, as viewed in FIG. 2, is shown as being pierced with a plurality of regularly arranged and closely spaced openings 55 communicating with tubes or pipes 56 fixed to the wall 54. These tubes 56 extend perpendicularly from the wall and are directed toward the path and the surface of the sheet moving therealong. The upper blasthead 38 is similarly constructed. As a glass sheet passes between the tubes 56 of the opposed blastheads 37 and 38, the air flowing in individual streams from the tube against the upper and lower surfaces of the sheet causes rapid cooling of the sheet to temper the glass.

As mentioned above, the volume of cooling air flowing in the individual streams may be regulated so as to cause the sheet to warp or bend to a desired curvature thereby eliminating the need for contacting the heat softened surfaces of the sheet with a bending mold or other bending device. Herein, this is accomplished by regulating the pressure of the air in the plenums 52 so as to maintain the air in the upper and lower plenums at different pressures whereby a greater volume of air will be directed against one of the surfaces of the sheet than against the other of the surfaces.

Through a phenomena which is not completely understood, it has been found that, when treated in this manner, the sheet will warp or bow away from the surface which is cooled at the faster rate. This is believed to result from the fact that the surface of the sheet being cooled at the faster rate contracts to a limited degree and then sets thereby preventing any further contraction of this surface. Then further cooling of the sheet results in the remainder of the sheet, including the opposite surface, contracting to a greater degree and the sheet warping to compensate for this differential strain. The end result is that, after the opposed surfaces of the sheet have been cooled below the temperature of the annealing range of the glass (below 900° F. for soda-lime-silica glass), the surface of the sheet cooled at the slower rate will have contracted more than the opposite surface and the amount of contraction is proportionate to the differential in the rate of cooling of the sheet from the elevated softening point to the lower temperature mentioned above.

In the present instance, the pressure of the air directed against the upper and lower surfaces of the sheet is relatively high to insure sufficient volume of air being directed against the sheet to chill the latter and to temper the glass to the degree desired. To this end, the pressure maintained in the plenums 52 may be in the range of about 25 inches to 40 inches water column. In accordance with the preferred embodiment of the invention, to effect the differential rate of cooling, the pressure of the air is maintained at about 35 inches w.c. in the upper plenum and at about 25 inches w.c. in the lowermost plenum. This differential in pressure causes a greater volume of air to be directed against the uppermost surface which results in the uppermost surface cooling at a faster rate whereby the sheet arches or bends through its longer dimensions or about its transverse axis upwardly away from the conveyor rolls.

The use of the illustrated tube-type blastheads operating at relatively high pressures has been found to be very efficient equipment for tempering thin sheets of glass since a large volume of air may be directed against the sheet and this air, having performed its cooling function, may then readily escape away from the surface of the sheets between the tubes permitting a continuous flow of fresh air to reach the sheet surfaces from the blastheads.

This apparatus may have one drawback, however, since during a tempering procedure, especially with thin sheets when the sheets are very rapidly cooled, quite often the sheets will rupture and disintegrate into comparatively small particles. Should this happen in the tube-type blastheads, these particles would plug the tubes in the lower blasthead and interrupt the flow of air therefrom. To avoid this, the present invention contemplates using a sufficient volume of air to enable the tempering to take place in a very short time and then rapidly moving the sheets from between the blastheads so that, should the sheets break, they will be downstream from the tubes and their breakage will not interfere with the operation of the blastheads.

To this end, after the sheet has been chilled by the tube-type blastheads to a temperature wherein the upper surface is approximately 850° F. and the lower surface approximately 775° F., the leading edge of the sheet interrupts the light beam C of the single or sensing device 41 and the variable speed transmission unit coupled to the power source 32 will be shifted to increase the linear speed of the conveyor rolls 30 and 31 from about 200 inches per minute to about 1000 inches per minute. In this manner, the sheets are very rapidly conveyed out of the tube-type blastheads at the completion of the tempering phase of the operation. For example, at the pressures of the air and the speeds indicated above, it has been found that a sheet may be satisfactorily bent to a desired curvature and completely tempered within four seconds.

Further to avoid any malfunction of the apparatus due to the breaking of the sheet during the tempering procedure the chilling section C and the cooling section D are spaced apart along the path to provide an open area therebetween as shown in FIG. 1. This open area between the chilling and cooling sections is of a dimension at least equal to, but preferably slightly larger than, the dimension of the sheet measured along an axis to the path of travel of the sheet. With this arrangement, if the sheet starts to break in the blastheads, it is moved into the open area before it disintegrates so that the pieces will fall harmlessly through the conveyor.

Upon passing through the open area, the sheets move into the cooling section D and between one or more pairs of upper and lower blastheads 44 and 45. Blasts of cooling air from these blastheads are directed upon the opposite surfaces of the bent and tempered glass sheets in a well-known manner to continue cooling of the same. The blastheads, as herein shown, are provided with spaced fins 58 and 59, respectively, extending transversely of the path of travel of the sheets and having slotted openings 60 to direct long, narrow streams of air upon the surfaces of the sheets. The degree of cooling of the glass surfaces is controlled by the pressure of the air and differential air pressures are applied to the upper and lower sheet surfaces.

During movement of the bent sheet through the cooling section D, the controlled differentials of air pressure serve to exert a desired degree of downward pressure on the upper surface such that the sheet will be lightly maintained on the rolls 34 without "drifting" while the pressure against the bottom surface will function to set up a floating action as the sheet traverses the rolls. Thus, the air pressure in the upper blastheads 44 can be within a range of 10" to 6" water column (preferably about 7") and the air pressure in the lower blasthead within a range of 7" to 5" water column (preferably 6").

When each sheet reaches a position, as indicated in broken line designated by the letter *e* in FIG. 1, between the upper and lower blastheads, it will activate the signal device 46 (FIG. 8) whereupon the output speed of power source 32 will be reduced to operate the rolls 31 at the slower speed that is comparable to the maintained rate of speed of the rolls 34. As viewed in FIG. 4, the bent sheet 16 is supported on the rolls 34 and between the blastheads 44 and 45 of the cooling section D. To increase the effective area of the cooling action particularly against the bottom surface of the sheet, the rolls 34 comprise a plurality of shafts 61 on which spaced collars 62 of a refractory fiber material are mounted.

Figure 9:
FIGS. 9 to 12 are illustrations of sheets of glass that have been heated and further processed, as by bending and/or tempering in accordance with the invention.
Figure 10:

By way of illustration, there is shown in FIG. 9, an edge view of a flat sheet of tempered glass which was initially heated to a temperature of 1180° F. both upper and lower surfaces, and then tempered with substantially equal pressures of 25" being directed toward the sheet surfaces. As indicated, in this case the sheet will remain flat. In FIG. 10 there is shown a concavedly bent glass sheet which was produced by being heated on both surfaces to a temperature of 1180° F. and then caused to bend, while becoming tempered, by the application of air pressure of 25" against the upper surface and of 35" against the lower surface.

Figure 11:

On the other hand, and as stated above, a glass sheet having been heated on its upper surface to a temperature of 1180° F. and on its lower surface to a temperature of 1140° F. will be caused to bend to a convex curvature as in FIG. 11 during the application of air pressures of 35″ against the upper surface and of 25″ directed against the lower surface.

The differential of rate of cooling the upper and lower surfaces of a sheet in section C has much greater influence on the final curvature of the sheet than the differential in temperature developed in the furnace B. Normally the surface of a sheet cooled more rapidly in the section C will be the convex side in the final curvature.

It has also been found possible to produce a bent sheet of substantially similar convex curvature by employing heat differentials as of 1140° F. (upper surface) and 1180° F. (lower surface) and air pressures of 35″ and 20″ respectively. In each of these representative instances, it is of particular interest to note that the glass sheets would not be supported, while being bent and tempered, on any bending apparatus.

In accordance with another aspect of the invention, the air in the plenums associated with the blastheads 37 and 38 can be maintained at substantially uniform, selected pressures and the plenums constructed as herein shown so that the volume of air in at least certain of the blastheads can be selectively modified or varied to produce different rates of cooling from the central area of the sheet outwardly into the end areas. Generally stated, the actual curvature to which a heated sheet is shaped can be determined by the distribution of air at selectively different degrees of pressure across the sheet.

Figure 5:
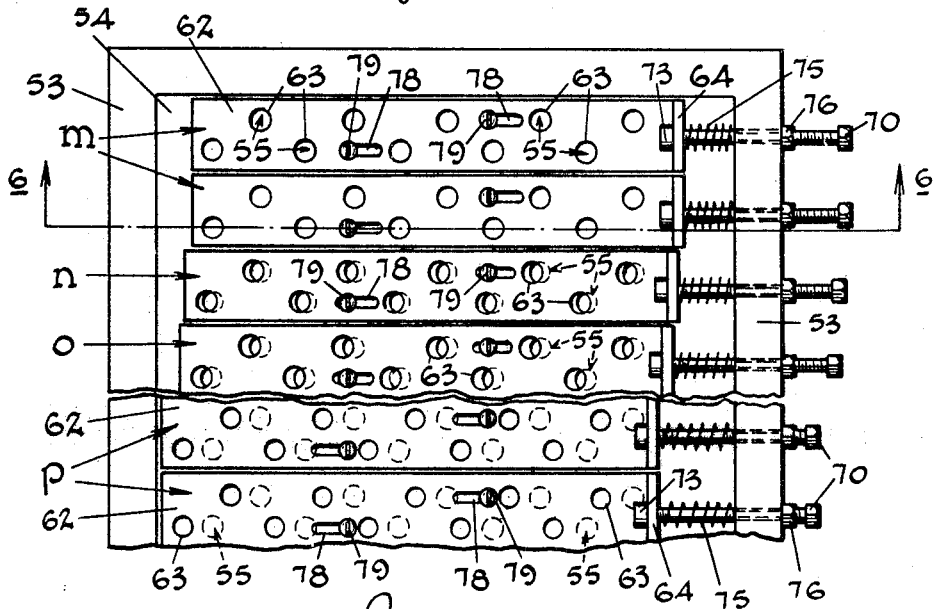
FIG. 5 is a plan view of a part of the cooling apparatus.
Figure 7:
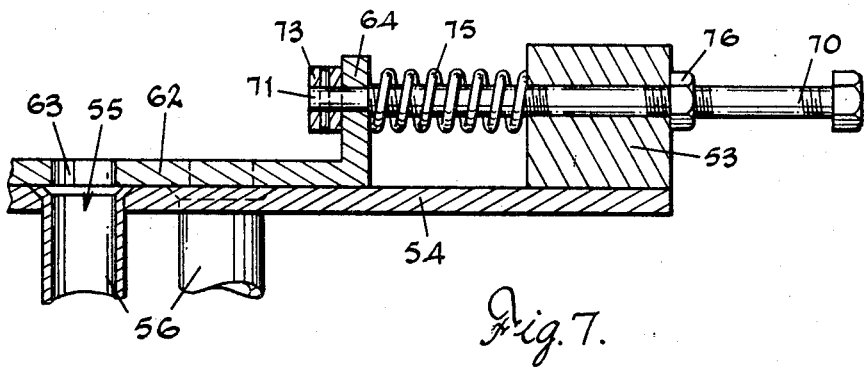
FIG. 7 is an enlarged detail view.

For these purposes, the interior of at least one plenum is provided with slide valves having openings registering with the openings 55 in a full open position or progressively diminishing the areas of the openings 55 as may be desired. As shown in FIGS. 5, 6 and 7, each plenum, defined by the substantially continuous side enclosure wall 53 and facing wall 54, is equipped with slide or valve plates 62 formed with parallel rows of openings 63 and a vertical end flange 64. As best seen in FIG. 6, each opening 55 in the wall 54, and communicating tube 56 secured therein, is in registry with an opening 63 which embodiment corresponds with the relation of the openings 63 in the valve plates 62, designated by the letter *m* in FIG. 5. On the other hand, valve plates 62, designated by the letters *n* and *o*, are positioned to indicate varying degrees of partial closure of the openings 55 as the openings 63 are moved thereover. The valve plates, designated by the letter *p*, have been located so as to completely close the related openings 55.

Means for conveniently and selectively shifting the positions of the valve plates is provided by threaded members or bolts 70 threadedly received in one portion of the side wall 53. As viewed in FIG. 7, each bolt 70 has an end 71 of reduced diameter that is passed through a journal opening 72 in a plate flange 64 and outwardly thereof carries a "pinned" collar 73. Conventionally, as the bolt is turned inwardly or outwardly, the flange 64 will push or pull the integral plate 62 therewith. To assist the endwise movements of the plates, a coil spring 75 is interposed between the flange 64 and the inner surface of wall 53, said spring being substantially compressed when the openings 63 of the plate 62 are in full registry with the related openings 55 and acting to urge the associated plate endwise as the bolts are turned inwardly. Further and/or inadvertent rotation of the bolts, in either direction, can be resisted by lock nuts 76 carried by each bolt and abutting the outer surface of the wall 53.

Each plate 62 is provided with guide slots 78 through which screws 79 are passed and threaded into the wall 54. In the case of the plenum of the lower blasthead 37, the screws also serve to maintain the plates in sliding contact with the inner surface of wall 54. Additionally and since in actual operation the valve plates are fully enclosed within the related plenum, the slots have a determined length so that, as in the case of the valve plates 62, as at *m*, the openings 63 will fully register with the openings 55 when the screws 79 reach one end of the related slots 78 and with the screws at the opposite end of the slot, it will be recognized that the openings 55 are completely closed as at *p*.

Referring briefly to FIG. 2, it is believed apparent that with the bolts 70 in the fully retracted position equal amounts of air pressure will be directed through the tubes 56 to the entire surface areas of the sheet. The adjustability of the several valve plates in each plenum will therefore permit considerable variation in the cooling action to be obtained and thus the desired curvature to be produced in the sheet can be controlled in the section C.

Figure 12:

In fact, the type of curves represented in FIGS. 10 and 11 as being substantially cylindrical can be varied to produce a curved sheet as in FIG. 12. This shaped condition includes a central area of relatively shallow curvature and end areas including more sharply bent sections. Such bent sheets of tempered glass are readily and repeatedly reproduced by adjusting the open areas of the openings 55 and 63 in each of the plenums.

Figure 13:
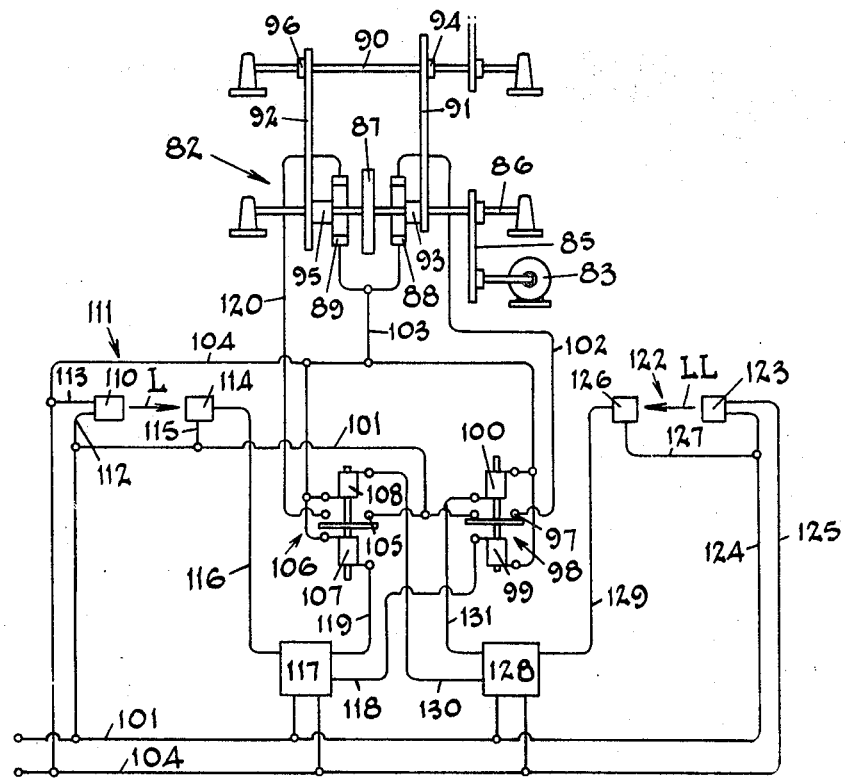
FIG. 13 is a diagrammatic view of a variable speed source of power and a control system therefor.

A substantially conventional control system is shown in FIG. 13 as being representative of a system employed in connection with either the power source 25 or the source 32. As herein disclosed, a typical power source 82 includes a motor 83, the shaft 84 of which is coupled by belt 85 to a first or input shaft 86 journaled at its ends in suitable bearings. A driving or armature member 87 is keyed on shaft 86 and is adapted to be selectively engaged by either of two driven or field members 88 and 89 freely rotatable on shaft 86. These field pieces are coupled to a second or output shaft 90, journaled at its ends in suitable bearings, by belt drives 91 and 92 entrained about pairs of pulleys 93–94 and 95–96 respectively. As herein provided, pulley 93 is understood to be an integral component of field member 88 and its proportional ratio to pulley 94 is such that belt 91 will drive shaft 90 at a preselected slower rate of speed. As presently shown, the engaged pair of contacts 97 of relay switch (R.S.) 98, equipped with opposed solenoids 99 and 100, complete a circuit from source line 101 and line 102 through field member 88 and armature 87 and line 103 to the opposite source line 104.

On the other hand, pulley 95 is related to field member 89 and its proportional ratio to pulley 96 is selected to operate shaft 90, through belt 92 at the desired higher rate of speed. The circuit of field member 89 can be made through presently disengaged pair of contacts 105 of R.S. 106, equipped with opposed solenoids 107 and 108, as will shortly be discussed in detail.

Source lines 101 and 104 are connected to the light source 110 of a signal or sensing device 111 by lines 112 and 113, while one side of a photoelectric cell 114 is connected by line 115 to source line 101. Now, when the leading edge of a sheet 16 intercepts the beam L from light source 110, the cell 114 is permitted to establish a circuit by line 116 to a timing relay 117, in series with source lines 101 and 104; said timer being employed, if desired, to monitor on the activity of R.S. 98 and R.S. 106. Accordingly after completion of line 116, T.R. 117 completes a first circuit by line 118 through solenoid 99 of R.S. 98 to source line 104 to disengage contacts 97 and open the circuit of lines 101 and 102 to field member 88 thereby idling the drive of shaft 90 by belt 91. A second circuit from T.R. 117 establishes a circuit by line 119 through solenoid 107 of R.S. 106 to source line 104 thereby engaging contacts 105. This will establish a circuit from source line 101 by line 120 through field member 89 and armature 87 and line 103 to opposite source line 104. When engaged, the armature through pulley 95 and belt 92 will drive shaft 90 at a desired rate of high speed.

Thus, when a glass sheet approaches the exit end of the furnace or of the primary cooling section, it produces activation of the photoelectric cell 114 with resultant opening of contacts 97 and closure of contacts 105 to operate the associated conveyor rolls at the higher rate of speed. However, when the sheet is being subjected to initial cooling in the section C or is being moved into the vicinity of the endmost series of conveyor rolls 34 in section D, it is desirable to slow its movement. With further reference to FIG. 13, a second signal or sensing device 122 has a light source 123 connected to source lines 101 and 104 by lines 124 and 125 and a photo-electric cell 126 similarly connected at one side by line 127 to line 124. When the beam LL from light source 123 is intercepted, the cell 126 completes a circuit from line 127 to T.R. 128 by line 129. This timing relay, in series with source lines 101 and 104, completes a circuit by line 130 through solenoid 108 of R.S. 106 to source line 104 thereby to disengage contacts 105 thereby de-energizing field member 89 and armature 87. This will uncouple the driving influence of shaft 86 from driven shaft 90. A second circuit from T.R. 128 substantially simultaneously is completed by line 131 through solenoid 100 of R.S. 98 to source line 104. This will serve to reengage the pair of contacts 97 to reestablish the circuit of line 102 to field member 88. In consequence, the shaft 90 will again be driven at the slow rate of speed.

As noted above, while bent, tempered glass sheets produced by the method and apparatus of this invention can be used for various purposes, the invention is of particular utility in the making of relatively thin bent, tempered backwindows for the convertible type of automobile as a novel replacement for the plastic glazings known to crack and lose transparency during use. The bent sheet, illustrated in FIG. 3, is representative of this type of window and, as herein disclosed for purposes of illustration, is of soda-lime-silica composition of ⅛" thickness.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:
1. A method of bending and tempering glass sheets, comprising supporting a sheet in a substantially horizontal position for movement along a predetermined path through a heating area, a chilling area and a cooling area located along said path, moving said sheet through said heating area at a first preselected speed, heating said sheet to substantially the softening point of the glass as it moves through said heating area, advancing said heated sheet out of said heating area and into said chilling area at a speed greater than said first speed, reducing the rate of movement of said sheet through said chilling area to a third speed slower than said second speed, directing a plurality of individual but closely spaced streams of cooling fluid under pressure perpendicularly against the opposite surfaces of said sheet as it moves through said chilling area to temper the glass, controlling the pressure of said streams of cooling fluid being directed at each of the opposite surfaces of the sheets thereby to cool the surfaces at different rates causing said sheet to warp to a desired curvature, advancing said sheet out of said chilling area and into said cooling area at a fourth speed greater than said third speed, and then reducing the rate of movement of said sheet to a fifth speed slower than said fourth speed as said sheet moves through said cooling area.

2. A method of bending and tempering glass sheets as defined in claim 1, in which the upper surface of the sheet is cooled more rapidly than the lower surface.

3. A method of bending and tempering glass sheets as defined in claim 1, in which during heating, the upper surface of said sheet is heated to a higher temperature than the bottom surface.

4. A method of bending and tempering glass sheets as defined in claim 1, wherein the sheet is moved at said fourth speed from said chilling area across an open space exposed to the atmosphere having dimensions greater than the dimension of the sheet before said sheet enters said cooling area.

5. A method as defined in claim 1 in which the volume of air in individual streams is varied transversely of said path of travel to vary the cooling of selected portions of the sheet to bend said sheet to a predetermined curvature.

6. In a method of bending and tempering glass sheets wherein a horizontally disposed sheet is conveyed along a substantially horizontal predetermined path while being heated to substantially the softening point of the glass and the top and bottom surfaces of the sheet are subsequently differentially chilled to temper the glass and bow the sheet to a predetermined degree of curvature, the improvement which comprises shaping said bowed curvature to a preselected contour by differentially chilling one of said surfaces from the central area thereof outwardly toward an edge area.

References Cited

UNITED STATES PATENTS

| | | | |
|---|---|---|---|
| 3,265,484 | 8/1966 | Ritter | 65—104 |
| 3,374,078 | 3/1968 | Wright | 65—348 XR |
| 3,396,000 | 8/1968 | Carson et al. | 65—104 |

ARTHUR D. KELLOGG, Primary Examiner

U.S. Cl. X.R.

65—106, 182, 351